United States Patent [19]

Osterman et al.

[11] 4,357,212

[45] Nov. 2, 1982

[54] ENERGY EFFICIENT APPARATUS FOR VAPORIZING A LIQUID AND CONDENSING THE VAPORS THEREOF

[75] Inventors: Harry F. Osterman, Westfield, N.J.; George C. Nylen, Tonawanda, N.Y.

[73] Assignee: Allied Chemical Corporation, Morris Township, Morris County, N.J.

[21] Appl. No.: 220,883

[22] Filed: Dec. 29, 1980

[51] Int. Cl.$^3$ .............................................. B01D 3/42
[52] U.S. Cl. .................................... 202/170; 202/206
[58] Field of Search ............... 202/160, 170, 206, 181, 202/235, 168, 169; 203/24, 26, 2, DIG. 4, DIG. 8, 100, 99; 62/238, 199, 183; 134/90, 105, 107, 108, 109

[56] References Cited

U.S. PATENT DOCUMENTS

| | | | |
|---|---|---|---|
| 1,466,670 | 3/1925 | Monti | 203/100 |
| 3,070,463 | 12/1962 | Barday | 134/11 |
| 3,091,098 | 5/1963 | Bowers | 62/180 |
| 3,234,109 | 2/1966 | Lustenader | 203/22 |
| 3,299,649 | 1/1967 | McGrath | 62/79 |
| 3,308,839 | 3/1967 | Barday | 134/76 |
| 3,375,177 | 3/1968 | Rand | 202/170 |
| 3,460,990 | 8/1969 | Barday | 134/31 |
| 3,461,460 | 8/1969 | McGrath | 203/11 |
| 3,486,985 | 12/1969 | McGrath | 202/173 |
| 3,492,205 | 1/1970 | Webber | 203/26 |
| 3,699,006 | 10/1972 | Hasslacher | 203/4 |
| 3,869,351 | 3/1975 | Schwartzman | 202/172 |
| 4,003,798 | 1/1977 | McCord | 202/160 |
| 4,014,751 | 3/1977 | McCord | 202/160 |
| 4,209,364 | 2/1980 | Rothschild | 203/11 |
| 4,210,461 | 2/1980 | Moree et al. | 134/11 |

*Primary Examiner*—Frank Sever
*Attorney, Agent, or Firm*—Arthur J. Plantamura; Jay P. Friedenson

[57] ABSTRACT

The present invention provides a novel apparatus and process for vaporizing a liquid and condensing the vapors thereof. The apparatus and process utilize heat of compression for vaporizing the liquid. The apparatus includes a still (10), a closed refrigeration system (12), an auxiliary condensing coil (24) separate from refrigeration system (12), and a valve (28) for controlling heat extraction by auxiliary coil (24). In a particularly useful embodiment, the apparatus further includes a trough (41) for collecting the condensed vapors. The trough is located within still (10). Auxiliary coil (24) extracts from the vapors, heat in excess of that necessary to maintain thermal balance in the apparatus.

The novel process of the present invention includes the steps of compressing a gaseous working fluid to a high pressure and adding heat of compression thereto; transferring heat including the heat of compression from the working fluid to a liquid in still (10), as a result of which the liquid is vaporized and the resulting working fluid contains sensible heat; passing the resulting working fluid to evaporator coil (18) whereby the working fluid entering evaporator coil (18) contains the sensible heat; and removing from the vapors resulting from vaporization of the liquid, heat in excess of that necessary to maintain thermal balance in the apparatus (12). The excess heat is removed by auxiliary condensing coil (24), which is separate from the refrigeration system.

7 Claims, 1 Drawing Figure

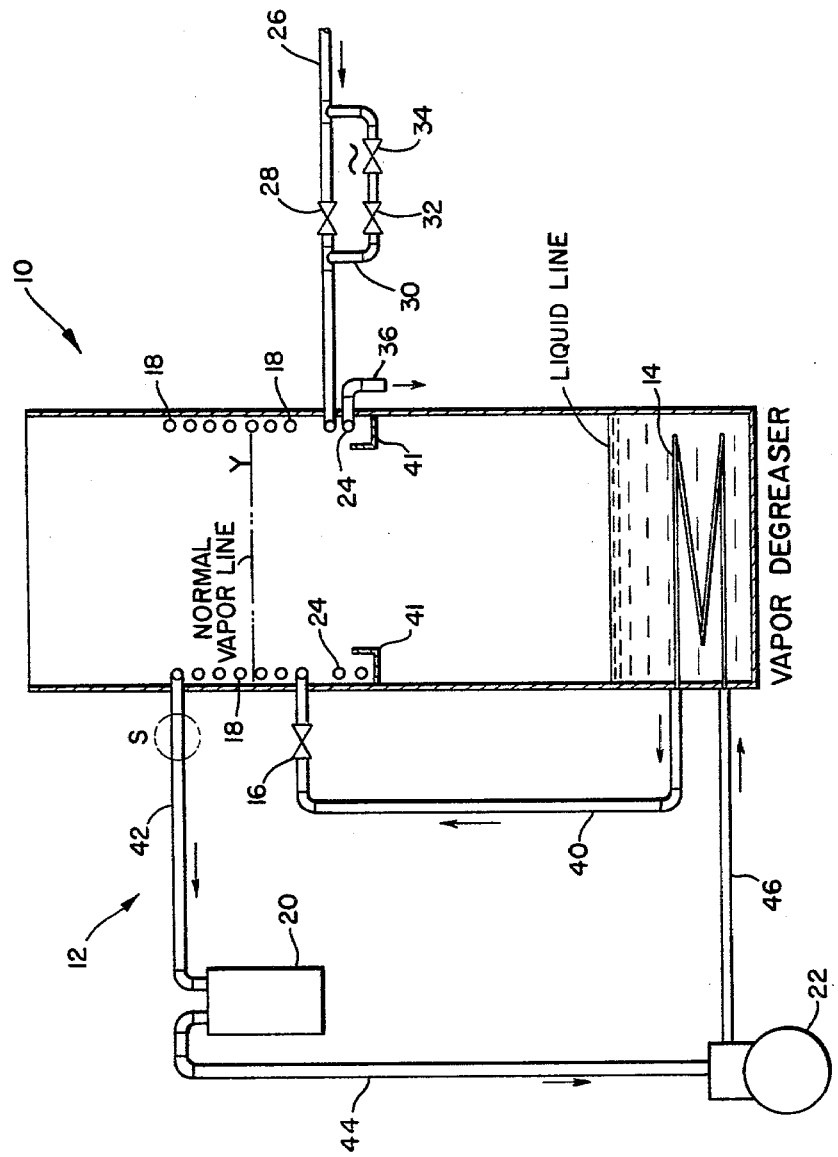

ENERGY EFFICIENT APPARATUS FOR VAPORIZING A LIQUID AND CONDENSING THE VAPORS THEREOF

TECHNICAL FIELD

This invention relates to a novel apparatus and process for conducting a distillation and specifically relates to a novel vapor degreasing apparatus and novel process for vapor degreasing. Additionally, this invention relates to an apparatus and process useful for carrying out a chemical reaction under reflux conditions.

BACKGROUND ART

It is known to use the condenser and evaporator coil of a closed refrigeration system to heat a fluid and to condense the vapors of a fluid. Illustrative of this type of prior art are U.S. Pat. Nos. 1,466,670 to Monti, 3,070,463 to Barday, 3,091,098 to Bowers, 3,234,109 to Lustenader, 3,299,649 to McGrath et al, 3,460,990 to Barday, 3,461,460 to McGrath, 3,486,985 to McGrath, 3,492,205 to Webber, 3,699,006 to Hasslacher, 3,869,351 to Schwartzman, 4,003,798 to McCord, 4,014,751 to McCord, 4,209,364 to Rothschild, 4,210,461 to Moree et al (column 2, line 66 through column 3, line 11), and 3,308,839 to Barday.

Also known is control of the vapor level within a degreaser apparatus by using a temperature sensing device to actuate a flow control valve that regulates the flow of cooling fluid in the cooling coils. Exemplary of this type of prior art is U.S. Pat. No. 4,078,974 to McCord, which discloses that the heating element thereof may be a condensing coil in a refrigeration system (column 3, lines 43-45).

The Schwartzman patent, listed above, shows the use of a coil 25 to provide an additional cooling effect and in order to warm the seawater prior to entry into the tank thereof. Coil 25 is located above evaporator coil 24 of the refrigeration system thereof.

U.S. Pat. Nos. 3,308,839 and 3,460,990 to Barday, listed above, show use of a water-cooled heat-absorbing element 56 for maintaining thermal equilibrium. However, Barday's apparatus unnecessarily enables removal of some of the sensible heat in the working fluid passing from the condenser to the evaporator coil of the refrigeration system thereof, by supplemental heat absorbing element 58.

This prior art and the other prior art of which we are aware fails to provide an energy efficient apparatus and process for vaporizing a liquid and condensing the vapors thereof that utilizes heat of compression for vaporizing the liquid and that is capable of maintaining thermal balance in the apparatus by modulation of heat extraction from vapors of the liquid. Furthermore, this prior art fails to provide an energy efficient apparatus and process of the type described above that results in an increased distillation rate, an increased condensation rate, an increased delivery of heat to a condenser of the closed refrigeration system, and an increased coefficient of performance.

Disclosure of the Invention

It is accordingly one object of the present invention to provide a novel apparatus and method that utilize heat of compression for vaporizing a liquid and that maintain thermal balance in a closed refrigeration system used to vaporize the liquid and condense the vapors thereof, by modulating heat extraction from the vapors.

A further object of the present invention is to provide an apparatus and process of this type that provides an increased distillation rate, an increased condensation rate, an increased delivery of heat to a condenser of the closed refrigeration system, and an increased coefficient of performance.

Additional objects, advantages and novel features of the invention will be set forth in the description which follows, and in part, will become apparent to those skilled in the art upon examination of the following, or may be learned by practice of the invention. The objects and advantages of the invention may be realized and attained by means of instrumentalities and combinations particularly pointed out in the appended claims.

To achieve the foregoing objects and in accordance with the purpose of the invention, as embodied and broadly described herein, the present invention is directed to an energy efficient apparatus for vaporizing a liquid and condensing the vapors thereof. The apparatus includes a still, a closed refrigeration system, at least one auxiliary condensing coil, and means for controlling heat extraction by the auxiliary condensing coil.

The closed refrigeration system includes a condenser located within the still and in heat-transfer relationship with the liquid, an evaporator coil, a compressor, and a sensible heat-conveying line connecting the condenser to the evaporator coil. In operation, the refrigeration system contains a working fluid; the compressor raises the working fluid to a high pressure and adds heat of compression thereto; the condenser transfers heat including the heat of compression from the working fluid to the liquid, as a result of which the liquid is vaporized and the resulting working fluid contains sensible heat; and the sensible heat-conveying line passes the resulting working fluid from the condenser to the evaporator coil whereby the working fluid entering the evaporator coil contains the sensible heat.

The auxiliary coil serves to contact the vapors resulting from vaporization of the liquid and to extract from the vapors, heat in excess of that necessary to maintain thermal balance in the apparatus. The auxiliary coil is separate from the refrigeration system, and is situated between the condenser and the evaporator coil whereby the excess heat is removed prior to the vapors contacting and condensing upon the evaporator coil. The auxiliary coil has heat extraction controlling means, which control heat extraction by the auxiliary coil whereby the excess heat is removed by the auxiliary coil from the vapors.

In a particularly useful embodiment, the apparatus further includes a trough for collecting the condensed vapors. The trough is located within the still and situated between the condenser and the auxiliary coil, as a result of which the condensed vapors are collected within the still for removal therefrom.

Also provided is an energy efficient process for vaporizing a liquid and condensing the vapors thereof. The process includes the steps of passing a working fluid in a gaseous state from an evaporator coil to a compressor, the evaporator coil and the compressor being in a closed refrigeration system that includes (1) a condenser located within a still containing a liquid to be vaporized, the condenser being in heat-transfer relationship with the liquid, and (2) a sensible heat-conveying line connecting the condenser to the evaporator coil; compressing the gaseous working fluid to a high pressure and adding heat of compression thereto; passing the high pressure gaseous fluid containing the heat of compression to the condenser whereby heat including the heat of compression is transferred from the high pressure gaseous fluid to the liquid, as a result of which the liquid is vaporized and the resulting working fluid contains sensible heat; passing the resulting working fluid by the residual heat-conveying line to the evaporator coil whereby the working fluid entering the evaporator coil contains the sensible heat; and removing from the vapors resulting from vaporizing the liquid, heat in excess of that necessary to maintain thermal balance in the apparatus. Removal of the excess heat is by heat transfer contact between the vapors and at least one auxiliary condensing coil. The auxiliary coil is separate from the refrigeration system, and is situated between the condenser and the evaporator coil whereby the excess heat is removed prior to the vapors contacting and condensing upon the evaporator coil.

In an especially useful embodiment, the process further includes the step of collecting the condensed vapors in a trough. The trough is located within the still and is situated between the condenser and the auxiliary coil, both of which are also located within the still.

BRIEF DESCRIPTION OF THE DRAWING

Reference is hereby made to the accompanying drawing which forms a part of the specification of this application. This drawing shows a particularly useful embodiment of the apparatus according to the present invention.

BEST MODE FOR CARRYING OUT THE INVENTION

As explained above, in accordance with the invention, there is provided a novel energy efficient apparatus and process for vaporizing a liquid and condensing the vapors thereof. The apparatus and process, as explained in detail below, utilize heat of compression for vaporizing the liquid and thus produce an increased boil up rate.

In the especially useful embodiment described below, the condensed vapors are collected in a trough located within a still in which vaporization takes place, for removal of the condensate from the still. In this embodiment, the apparatus of the present invention is used with particular advantage as a vapor degreaser. However, when the present invention is used for carrying out a chemical reaction under reflux conditions, the condensed vapors are allowed to return to the still bottom, and repeated vaporization and condensation occurs. In another embodiment of the present invention, the condensed vapors are collected in a pot or flask located exterior to the still, rather than within the still itself. Thus, the present invention is useful for conducting a distillation in which vapors are collected outside a still, is useful for carrying out a chemical reaction under reflux conditions, and is useful for vapor degreasing purposes. Useful distillations include producing fresh water from salt water.

The invention will now be described with reference to the particularly useful embodiment shown in the drawing. In this embodiment, an apparatus according to the present invention includes a still, a closed refrigeration system, an auxiliary condensing coil, means for controlling heat extraction by the auxiliary condensing coil, and a trough for collecting the condensed vapors.

The closed refrigeration system includes a condenser located within a still and in heat-transfer relationship with a liquid to be vaporized. The refrigeration system further includes an evaporator coil, also located within the still, a compressor, and a line connecting the condenser to the evaporator coil. In operation, the refrigeration system contains a working fluid; the compressor raises the working fluid to a high pressure and adds heat of compression thereto; the condenser transfers heat including heat of compression from the working fluid to the liquid, as a result of which the liquid is vaporized and the resulting working fluid contains sensible heat; and the line passes the resulting working fluid from the condenser to the evaporator coil whereby the working fluid entering the evaporator coil contains the sensible heat.

The auxiliary condensing coil is separate from the refrigeration system, and is situated between the condenser and the evaporator coil. In this location, the auxiliary coil contacts the vapors prior to the vapors contacting and condensing upon the evaporator coil. This location of the auxiliary coil enables this coil to remove from the vapors, heat in excess of that necessary to maintain the apparatus thermal balance. If the excess heat were not removed, it would enter the refrigeration system upon condensation of the vapors on the evaporator coil, and the apparatus would become unbalanced and fail. Although the drawing shows only one auxiliary coil, additional auxiliary coils could be used in combination with the auxiliary coil shown.

Heat extraction by the auxiliary coil is controlled so that the amount of heat removed from the vapors by the auxiliary coil is in excess of that necessary to maintain thermal balance in the apparatus. Control is achieved, for example, by providing a needle valve in a line feeding a cooling fluid such as water to the auxiliary coil. The valve is adjusted to regulate the flow of the cooling fluid into the auxiliary coil.

Preferably, control is automatically modulated. Suitably, automatic modulation is achieved by locating a regulating device such as a thermocouple at the normal vapor line in the still. The regulating device responds to the location of a line formed by the vapors within the still by adjusting flow of the cooling fluid through the auxiliary coil. As the vapor line rises to the normal vapor line, the regulating device operates to increase the flow of the cooling fluid through the auxiliary coil. As a result, the vapor line drops, and the regulating device then operates to decrease the flow of the cooling fluid.

Conveniently, there is provided a main feed line with needle valve, which serves as a primary valve. This valve is adjusted so that the flow of the cooling fluid is insufficient to totally absorb the heat of compression under load conditions. Additionally, there is provided a parallel feed line that bypasses the portion of the main line having the primary needle valve. This bypass line has a needle valve, which serves as a secondary valve, and a solenoid valve located upstream from the secondary valve. The solenoid valve is opened or closed by the regulating device. When the solenoid valve is in an open position, additional cooling fluid flows through the auxiliary coil, and when the solenoid valve is in a closed position, cooling fluid flow is determined only by the primary needle valve.

Automatic modulation is also achieved by sensing temperature or pressure change in the refrigeration circuit and adjusting the flow of the cooling fluid in response. Sensors are conveniently located so as to monitor discharge of the evaporator coil or to monitor compressor head pressure. Conveniently, evaporator coil discharge is monitored by locating a modulating device such as a thermostat downstream from the evaporator coil. The modulating device suitably operates a system of the type described in the previous paragraph, in place of the regulating device.

The trough is located within the still, and is situated between the condenser and the auxiliary coil. As indicated above, the auxiliary coil and the evaporator coil are also located within the still. As a result, the condensed vapors are collected within the still for removal therefrom.

In another embodiment of the present invention, the auxiliary coil and the evaporator coil are located exterior to the still, and the condensed vapors are collected in a pot or flask located exterior to the still. Thus, the trough is unnecessary. In this embodiment, an apparatus in accordance with the present invention is used to conduct a distillation. The trough is also not needed when an apparatus in accordance with the invention is used to carry out a chemical reaction under reflux conditions.

An energy efficient process for vaporizing a liquid and condensing the vapors thereof using the particularly useful apparatus set forth above, will now be described. In the first essential step of the process, in accordance with the the invention, a working fluid in a gaseous state is passed from the evaporator coil to the compressor. In accordance with the invention, in the next step, the gaseous working fluid is compressed to a high pressure and heat of compression is added thereto. In the third essential step, the high pressure gaseous fluid containing the heat of compression is passed to the condenser whereby heat including heat of compression is transferred from the high pressure gaseous fluid to the liquid, which is in heat-transfer relationship with the condenser. As a result, the liquid is vaporized and the resulting working fluid contains sensible heat.

In accordance with the invention, in the fourth essential step, the resulting working fluid is passed to the evaporator coil by the sensible heat-conveying line whereby the working fluid entering the evaporator coil contains the sensible heat. In the next essential step, heat in excess of that necessary to maintain thermal balance in the apparatus is removed from the vapors resulting from vaporization of the liquid, by heat transfer contact between the vapors and and the auxiliary coil. The excess heat is removed in the manner described above, prior to the vapors contacting and condensing upon the evaporator coil. In accordance with the invention, in the next step, the condensed vapors are collected in the trough, for removal of the condensate from the still. In other embodiments briefly noted above, the condensate is not collected in the trough. Rather, the condensate is either collected exterior to the still or allowed to return to the still bottom.

In the particularly useful embodiment described in detail above, the apparatus of the present invention is very useful as a vapor degreaser. In this case, the liquid is a degreasing solvent. In a vapor degreaser, there is in combination at the still bottom, a degreasing solvent and high boiling contaminants such as lubricants. A suitable degreasing solvent ranges in boiling point from about 70° to 120° F. Exemplary solvents are trichlorotrifluoroethane (R-113), an azeotrope of R-113 and isopropanol, an azeotrope of R-113, ethanol, isopropanol and nitromethane, an azeotrope of R-113 and methylene chloride, and trichlorofluoromethane (R-11). High boiling point solvents are also useful. These include 1,1,1-trichloroethane (boiling point of 165° F.), trichloroethylene (boiling point of 188° F.) and perchloroethylene (boiling point of 250° F.). Thus, the solvent may have a boiling point ranging up to about 250° F.

The working fluid is any suitable refrigeration fluid, with R-12 being particularly suitable for use in the present invention.

In a vapor degreaser, automatic modulation of the heat extracted by the auxiliary coil is preferred since work loads introduced into the still, extract heat from the vapors as the temperature of the work load rises to the vapor temperature, and since the boiling point of the liquid material in the still bottom increases as the degreasing solvent is vaporized, condensed, and removed from the still. Automatic modulation is also preferred in conducting a distillation.

Reference is now made to the drawing accompanying the application which exemplifies a vapor degreaser in accordance with the invention. In this drawing, still 10 contains a degreasing solvent and contaminants. closed refrigeration system 12 includes a condenser 14, an expansion valve 16, an evaporator coil 18, an accumulator 20, and a compressor 22. Located within the still are condenser 14 and evaporator coil 18. Also located within still 10 is auxiliary condensing coil 24. Line 26 feeds a cooling fluid such as water to auxiliary coil 24. Line 26 has a needle valve 28. Bypass line 30 has a needle valve 32 and a solenoid valve 34 upstream from valve 32. The cooling fluid exits auxiliary coil 24 by line 36. Situated in still 10 at the normal vapor line is a thermocouple shown as Y in the drawing. The drawing shows in phantom a sensor S for monitoring temperature change in the discharge of the evaporator coil. The sensor is a thermostat.

In operation, liquid refrigerant at high pressure and containing residual heat is passed from condenser 14 by way of line 40 to expansion valve 16. The refrigerant is expanded through valve 16 into evaporator coil 18, where it evaporates at low pressure. The heat of vaporization is absorbed from the vapors, causing the vapors to condense. The refrigerant gas leaves coil 18 via line 42. This refrigerant gas contains the sensible heat and the heat of vaporization. The gas enters accumulator 20, which traps any residual refrigerant liquid. The refrigerant gas, free of any liquid, is drawn through line 44 by suction from compressor 22. Compressor 22 raises the refrigerant gas to high pressure and in doing so, adds heat of compression to the heat extracted by the gas in evaporator coil 18. The high pressure refrigerant gas is passed by line 46 to condenser 14, which is immersed in the degreaser solvent and contaminants. Heat including the heat of compression passes from the refrigerant to the liquid material in the bottom of the still causing this liquid material to boil and vaporize. The refrigerant is condensed to a liquid at high pressure. Auxiliary coil 24 contacts the vapors first and removes from the vapors heat in excess of that necessary to maintain thermal balance in the apparatus. The vapors then contact evaporator coil 18. Troughs 41 collect the condensate, for removing the condensate from still 10.

The thermocouple shown as Y responds to the location of the vapor line within still 10 in the following manner. As the vapor line rises to the normal vapor line, the thermocouple opens solenoid valve 34 to increase the flow of cooling fluid to auxiliary coil 24. As a result, the vapor line drops, and the thermocouple then operates to cause solenoid valve 34 to close so that the flow of cooling fluid from line 26 to auxiliary coil 24 is determined only by valve 28.

The below examples are illustrative of the invention. It is to be understood that these examples are not in any way to be interpreted as limiting the scope of the invention. Rather, it is intended that the scope of the invention be defined by the claims appended hereto.

EXAMPLE 1

Using the apparatus of the drawing, which is described in detail above, and operating under the conditions set forth in the Table, it is found that a compressor input (Compr. Load) of 3,739 BTU/hour produces a heat input to the condenser (Cond. Heat) of 13,833 BTU/hour, a distillation rate (BUR, that is, boil up rate) of 219 pounds/hour, and a coefficient of performance (COP) of 3.7. The refrigerant is R-12. The coefficient of performance is calculated by dividing the heat delivered to the condenser by the compressor load. In the Table, "Evap. Heat" is the heat extracted from the vapors by the evaporator coil, and the "Cond. Rate" is the condensing rate of the condensate.

COMPARATIVE EXAMPLE

Using an apparatus and procedure indentical to that described in Example 1 except that a heat exchanger is placed in line 46 between compressor 22 and condenser 14, and auxiliary coil 24 is not operated, there is obtained a heat input to the condenser of 10,641 BTU/hour, a distillation rate of 169 pounds/hour and a coefficient of performance of 2.84. By comparison, it can be seen that Example 1 provides an increase of 30% in the coefficient of performance at no increase in energy consumed.

EXAMPLES 2-5

Using the apparatus of the drawing, which is described in detail above, and using the conditions shown in the Table, runs are conducted using four other degreasing solvents. The results are shown in the Table. These results show that R-11 is the most energy efficient of the degreasing solvents tested.

The Comparative Example shows that an apparatus in accordance with the present invention, when compared with an apparatus that removes excess heat from the refrigeration system prior to the refrigeration fluid reaching the condenser, results in an increased boil up rate and an increase in pounds per hour of condensate recovered. Furthermore, there is, as mentioned above, an increased coefficient of performance. These improvements are at no increase in energy consumed.

The degreaser shown in the drawing is a vapor only degreaser. A multiple sump degreaser in accordance with the present invention may be constructed. In this type of degreaser, the condensate from an evaporator coil in a first sump is fed to a second sump, and so forth.

Industrial Applicability

The novel apparatus and process of this invention is useful for conducting a distillation in which vapors are collected outside a still, is useful for carrying out a chemical reaction under reflux conditions, and is useful for vapor degreasing purposes.

TABLE

| Example | Solvent | Boiling Point °F. | COP | R-12 Flow Lbs./Hr. | Cond. Heat BTU/Hr. | Evap. Heat BTU/Hr. | Cond. Rate Lbs./Hr. | BUR Lbs./Hr. | Compr. Load BTU/Hr. |
|---|---|---|---|---|---|---|---|---|---|
| 1 | A | 117.6 | 3.70 | 233 | 13,833 | 10,641 | 169 | 219 | 3739 |
| 2 | B | 115.7 | 4.09 | 263 | 15,742 | 12,102 | 151 | 197 | 3849 |
| 3 | C | 112.0 | 3.58 | 222 | 13,654 | 10,500 | 133 | 173 | 3816 |
| 4 | D | 97.7 | 4.47 | 237 | 15,249 | 11,983 | 115 | 147 | 3412 |
| 5 | E | 74.9 | 5.69 | 233 | 15,529 | 13,045 | 168 | 200 | 2727 |

The solvents used are as follows:
A is trichlorotrifluoroethane (R-113),
B is an azeotrope of R-113 and isopropanol,
C is an azeotrope of R-113, ethanol, isopropanol and nitromethane,
D is an azeotrope of R-113 and methylene chloride, and
E is trichlorofluoromethane (R-11).

We claim:
1. An energy efficient apparatus for vaporizing a liquid and condensing the vapors thereof, said apparatus utilizing heat of compression for vaporizing said liquid, said apparatus comprising
    (a) a still for containing a liquid to be vaporized;
    (b) a closed refrigeration system comprising (1) a condenser located within said still and in heat-transfer relationship with said liquid, (2) an evaporator coil, (3) a compressor, and (4) a sensible heat-conveying line connecting said condenser to said evaporator coil;
    said closed refrigeration system for containing a working fluid, said compressor for raising said working fluid to a high pressure and adding heat of compression thereto, said condenser for transferring heat including said heat of compression from said working fluid to said liquid, as a result of which said liquid is vaporized and the resulting fluid contains sensible heat, and said sensible heat-conveying line for passing said resulting working fluid from said condenser to said evaporator coil whereby the working fluid entering said evaporator coil contains said sensible heat;
    (c) means for recovering substantially all sensible heat from said compressor over that used to boil-up said liquid, so as to maintain the thermal balance of said apparatus, including at least one auxiliary condensing coil for contacting the vapors resulting from vaporization of said liquid and extracting therefrom, heat in excess of that necessary to maintain thermal balance in said apparatus; said at least one auxiliary condensing coil being separate from said closed refrigeration system, and being situated between said condenser and said evaporator coil whereby the excess heat is removed prior to said vapors contacting and condensing upon said evaporator coil; said at least one auxiliary condensing coil having heat extraction controlling means; and
    (d) said heat extraction controlling means for controlling heat extraction by said at least one auxiliary condensing coil whereby said excess heat is removed from said vapors by said at least one auxiliary condensing coil.

2. The apparatus of claim 1, further including trough means for collecting the condensed vapors, said trough means being located within said still and being situated between said condenser and said at least one auxiliary condensing coil, whereby said condensed vapors are collected within said still for removal therefrom.

3. The apparatus of claim 2, wherein said liquid is a degreasing solvent.

4. The apparatus of claim 3, wherein said degreasing solvent comprises a fluorocarbon selected from the group consisting of trichlorotrifluoroethane and trichlorofluoromethane.

5. The apparatus of claim 4, wherein said degreasing solvent is trichlorofluoromethane.

6. The apparatus of claim 1, wherein said heat extraction controlling means is automatically regulated by a modulating means situated within said still, said modulating means responding to the location of a line formed by said vapors within said still.

7. The apparatus of claim 1, wherein said heat extraction controlling means is automatically modulated by a regulating means located downstream from said evaporator coil, said regulating means responding to the temperature of the working fluid passing from said evaporator coil.

* * * * *